(12) United States Patent
Heaton et al.

(10) Patent No.: US 6,356,418 B1
(45) Date of Patent: Mar. 12, 2002

(54) SILICON STRUCTURAL SUPPORT OF LINEAR MICROACTUATOR

(75) Inventors: Mark W. Heaton, Irving; Michael K. Masten, Plano; Mark A. Avery, Dallas; Philip A. Congdon, Richardson; Tsen-Hwang Lin, Dallas, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/343,420

(22) Filed: Jun. 30, 1999

(51) Int. Cl.[7] .................................................. G11B 5/56
(52) U.S. Cl. .................. 360/294.1; 360/294.6
(58) Field of Search ............................ 360/294.1–294.6

(56) References Cited

U.S. PATENT DOCUMENTS

| 5,521,778 A | * | 5/1996 | Boutaghou et al. ......... 360/106 |
| 6,078,473 A | * | 6/2000 | Crane et al. ................. 360/104 |

* cited by examiner

*Primary Examiner*—Robert S. Tupper
(74) *Attorney, Agent, or Firm*—J. Dennis Moore; W. James Brady, III; Frederick J. Telecky, Jr.

(57) ABSTRACT

An integral computer hard drive microactuator support comprising a unitary member of solid material. The support includes a frame portion surrounding and defining an opening portion, and a platform portion disposed within the opening portion. Four fixed-fixed beam portions connect the platform portion to the frame portion, the fixed-fixed beam portions being generally rectangular in cross section and substantially straight along their length.

4 Claims, 1 Drawing Sheet

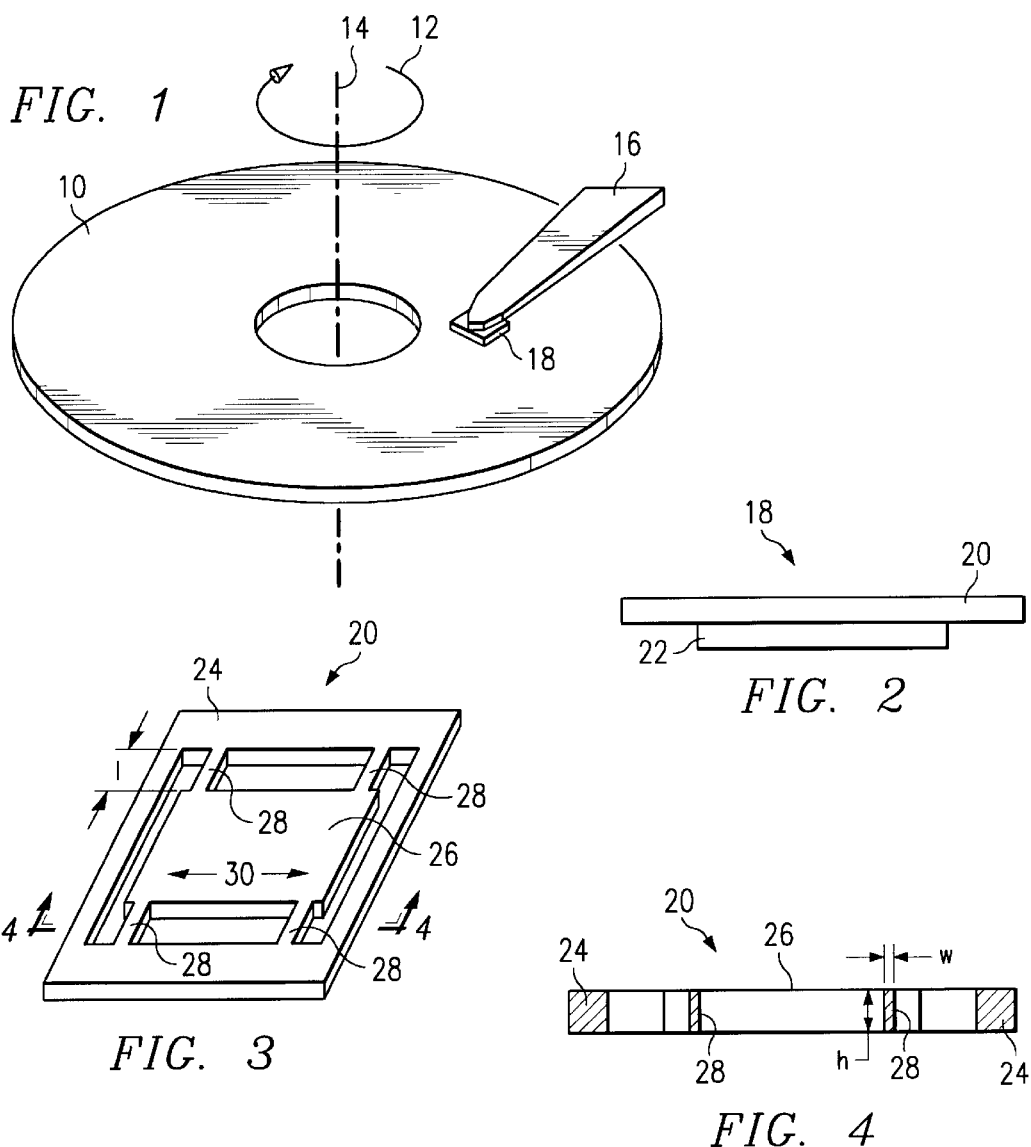
FIG. 1
FIG. 2
FIG. 3
FIG. 4
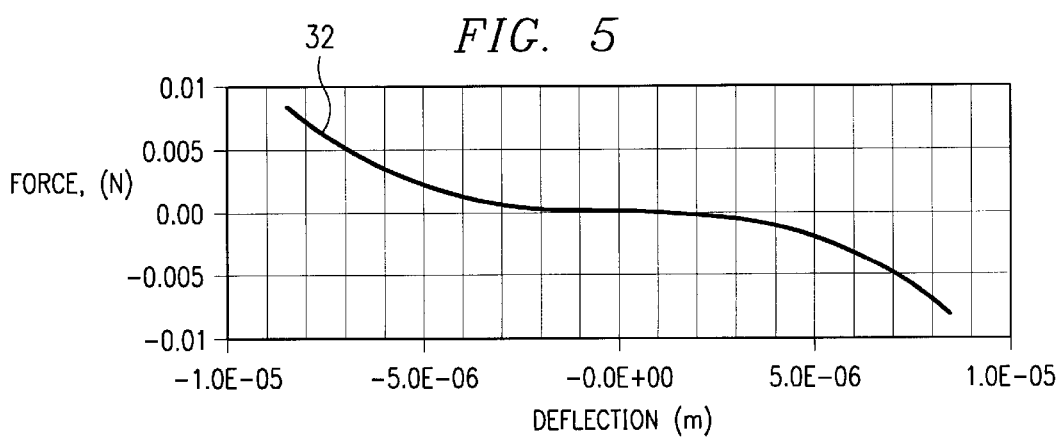
FIG. 5

SILICON STRUCTURAL SUPPORT OF LINEAR MICROACTUATOR

TECHNICAL FIELD OF THE INVENTION

This invention relates to actuator arms for computer hard disk drives, and more particularly relates to suspensions for micro actuators positioned on the ends of such actuator arms.

BACKGROUND OF THE INVENTION

Computer hard disk drives typically include one or more rigid magnetic disks that spin during operation. Each disk has an associated actuator arm that is controlled to move across the disk so as to allow a slider, positioned at the end of the actuator arm, to move to a desired track so that a read/write head mounted on the slider is able to read or write data from the track. In recent years, in response to demands for ever increasing data densities and ever increasing data transfer rates, the slider has been mounted on a movable spring assembly coupled to the actuator arm by collinear longitudinal arms integral with the assembly and on either end thereof. The structure permits rotation of the spring assembly, and thus the slider/head assembly, about the axis of the longitudinal arms, and thereby minimizes torsional vibrations that propagate along the actuator arm. An example of this is described in U.S. Pat. No. 5,381,288, which issued on Jan. 10, 1995, to Raymond M. Karm, II, and was assigned to Applied Magnetics Corporation, Inc.

More recently, a micro actuator has been mounted on the end of the actuator arm and coupled to the arm by a compliant suspension. The micro actuator serves as a secondary actuator, and has the benefit of having a greater bandwidth than the primary actuator arm. An example of this is described in Miu et al., "Silicon Microstructures and Microactuators for Compact Computer Disk Drives," Article presented at the Proceedings of the 14th IEEE Symposium on Mass Storage Systems, 1995. (See also U.S. Pat. No. 5,778,513, which issued on Jul. 14, 1998, to Denny K. Miu.) The arrangement disclosed in this article includes a "piggy-back microactuator" that includes a silicon microgimbal. The microgimbal is an integral silicon structure that includes a central slider/platform portion disposed within an outer frame portion. The slider portion and the frame portion are connected together by way of four serpentine suspension springs which serve as fixed-fixed beams. Miu states that helical springs would be "an obvious solution" to the problem of providing suspension springs, but proposes the serpentine planar microsprings as a practical alternative.

However, the serpentine suspension springs proposed by Miu are complex structures and therefore difficult to design specific characteristics and to make subsequent adjustments to the suspension dynamics. In addition, the directional stiffness pattern is not optimal for such an application, allowing excessive vibrations in the non-motor direction, for example.

Other serpentine suspension spring arrangements are described in U.S. Pat. No. 5,847,902, which issued to Clifford, Jr., et al., on Dec. 8, 1998, and U.S. Pat. No. 5,882,532, which issued to Field et al., on Mar. 16, 1999, both of which were assigned to Hewlett-Packard Company. These arrangements suffer basically the same problems and limitations as the Miu et al. arrangement.

Therefore, there is a need for an improved suspension for a microactuator on a hard drive actuator arm. Further, there is a need for an improved suspension that allows easier design of specific characteristics and subsequent adjustments the suspension dynamics. Still further, there is a need for an improved suspension having stiffness characteristics more optimally suited to a micro actuator for a hard drive actuator arm. In addition, there is a need for improved suspension having an improved directional stiffness patterns.

These needs are substantially met by the present invention.

SUMMARY OF THE INVENTION

In accordance with the present invention there is provided an integral computer hard drive microactuator support comprising a unitary member of solid material. The support includes a frame portion surrounding and defining an opening portion, and a platform portion disposed within the opening portion. Four fixed-fixed beam portions connect the platform portion to the frame portion, the fixed-fixed beam portions being generally rectangular in cross section and substantially straight along their length.

These and other features of the invention will be apparent to those skilled in the art from the following detailed description of the invention, taken together with the accompanying drawings.

BRIEF DESCRIPTION OF THE DRAWINGS

FIG. 1 is a partial diagram of a hard disk drive in accordance with the preferred embodiment of the present invention;

FIG. 2 is a view of the slider assembly of FIG. 1;

FIG. 3 is an orthogonal view of the support of FIG. 2;

FIG. 4 is a cross sectional view taken through section cut 4—4 of FIG. 3; and

FIG. 5 is a graph showing the stiffness characteristic of the support of the preferred embodiment.

DETAILED DESCRIPTION OF THE PREFERRED EMBODIMENT

FIG. 1 is a partial diagram of a hard disk drive in accordance with the preferred embodiment of the present invention. A hard magnetic disk 10 rotates, as shown by arrow 12 about an axis 14. An actuator arm 16 is disposed next to the disk 10, as shown, such that a novel slider assembly 18 mounted on the arm 16 is positioned very close to the surface of the disk 10.

FIG. 2 is a view of the slider assembly 18 of FIG. 1. The assembly 18 has two components, a support, or suspension, 20, and a head assembly 22 mounted on the support 20. The head assembly 22 includes an actuator subassembly for imparting motion to the head, as well as the magnetic element for data reading and writing to/from the disk 10 (FIG. 1). The head assembly 22 may be any of a number of designs, and is not relevant to the invention, so it is not described in further detail herein. The preferred embodiment of the present invention will be described in connection with FIGS. 3 and 4. FIGS. 3 and 4 are not drawn to scale, but relevant dimensions are provided in the text.

FIG. 3 is an orthogonal view of the support 20 of FIG. 2. The support 20 is an integral unit of a rigid, solid material suitable for fabrication by way low cost techniques, such as etching. Silicon has been found to be a particularly suitable material for the support 20, and is considered preferred. The Silicon may be mono-crystalline Silicon, but that is not required, since no electrical function is required of the support. However, if electrical function is to be provided on the support, in such case mono-crystalline Silicon is preferred, clearly. Etching provides a well known, cost effective and easily controllable method for forming the features of the support 20, and is, therefore, also considered preferred.

In the preferred embodiment of the support 20 a single layer of 75 micron thick Silicon is etched with the desired features, which will now be described. Being a layer of Silicon, it will be appreciated that the support 20 is a generally planar structure, as shown. A frame 24 defines an opening within which a moveable platform 26 is supported by four fixed-fixed type beams 28. The beams 28 are disposed in pairs on opposite sides of the platform 26, as shown. The beams 28 are generally rectangular in cross section, as shown in the cross section view of support 20 of FIG. 4, which is taken through section cut 4—4 of FIG. 3.

The direction of preferred motion is indicated by bidirectional arrow 30 in the plane of support 20, as shown. This direction of preferred motion will be along a motion axis in the direction perpendicular to the direction of the data tracks on the disk 10 when the slider assembly 18 is mounted on the arm 16 (FIG. 1). The beams 28 are aligned perpendicular to the motion axis, as shown. The beam 28 dimensions should be chosen to provide pliant response to the actuator force in the direction of preferred motion, while providing relatively high stiffness in all other directions.

The dimensions of each beam 28 are: height 75 microns, shown as dimension h in FIG. 4, width 3 microns, shown as dimension w in FIG. 4, and length 200 microns, shown as dimension l in FIG. 3. These dimensions are considered preferred, but other dimensions may be used, depending on number of factors which will be readily apparent to one of ordinary skill in this art area, once the principles set forth herein are understood. Such factors include the behavior of the platform 26 desired by the designer, the mass and configuration of the head assembly 22 to be supported and the characteristics of the actuator subassembly (not shown).

The use of rectangularly cross-sectioned beams 28 provides several significant advantages for suspensions of this type. Stiffness is, as desired maximum in all directions other than the desired direction, while pliancy is high in the desired direction shown by arrow 30 in FIG. 3. In addition, original design and modification of design for engineering optimization is comparatively easy. In fact, beam deflection calculations from any of the numerous mechanics of materials texts provide accurate estimates of force, deflection and stress, due to the simple geometries involved. This facilitates fast convergence for the designer to beam dimensions and locations for desired performance requirements.

A further benefit of the beam design according to the preferred embodiment of the present invention is that the stiffness characteristics in the direction of desired motion are optimal for hard drive microactuator applications. FIG. 5 is a graph showing a curve 32 of the stiffness characteristic of the support 20 of the preferred embodiment. The horizontal axis represents deflection of the platform 26 (FIG. 3) in the direction of desired motion, while vertical axis represents the force on the platform 26 required to produce such deflection. Note that the curve 32 reveals that the stiffness characteristic is non-linear in a desirable way. In particular, the stiffness increases as the deflection increases. This reduces the possibility of "run away" movement of the platform 26 if an excessive force is inadvertently applied from certain types of actuators. In addition, large arm 16 movements typically generate high accelerations deflecting the platform significantly. In other words, the platform 26 is less likely to bump against the frame 24 in such circumstances, thus reducing the likelihood of damage to the support 20 and the head assembly 22 (FIG. 2). In addition, in an undriven state the platform 26 will resonate with a lower amplitude.

Although the present invention and its advantages have been described in detail, it should be understood that various changes, substitutions and alterations can be made herein without departing from the spirit and scope of the invention as defined by the appended claims.

What is claimed is:

1. An integral computer hard drive microactuator support comprising a generally planar unitary member of solid material, comprising the following features:

a frame portion surrounding and defining an opening portion;

a platform portion disposed within said opening portion intended for motion only along a preferred axis parallel with the plane of said unitary member;

four fixed beam portions connecting said platform portion to said frame portion, and disposed in pairs on opposite sides of said platform portion, said fixed-fixed beam portions being substantially parallel to an axis perpendicular to said preferred axis.

2. A microactuator in accordance with claim 1, wherein said solid material is Silicon.

3. A microactuator in accordance with claim 1, wherein the dimensions of said fixed-fixed beam portions are: width 3 microns, height 75 microns and length 200 microns.

4. A microactuator in accordance with claim 1, wherein said four fixed-fixed beam portions are substantially rectangular in cross section and substantially straight along their length.

\* \* \* \* \*